US011110827B2

(12) United States Patent
Tsukigase et al.

(10) Patent No.: US 11,110,827 B2
(45) Date of Patent: Sep. 7, 2021

(54) VEHICLE SEAT OPERATING DEVICE (71) Applicants: Toyota Jidosha Kabushiki Kaisha, Toyota (JP); Toyota Boshoku Kabushiki Kaisha, Kariya (JP)

(72) Inventors: Takaya Tsukigase, Nagoya (JP); Hiroyuki Mita, Nagoya (JP); Toyotaka Watanabe, Kakamigahara (JP)

(73) Assignees: Toyota Jidosha Kabushiki Kaisha, Toyota (JP); Toyota Boshoku Kabushiki Kaisha, Kariya (JP)

( * ) Notice: Subject to any disclaimer, the term of this patent is extended or adjusted under 35 U.S.C. 154(b) by 0 days.

(21) Appl. No.: 16/448,591

(22) Filed: Jun. 21, 2019

(65) Prior Publication Data
US 2019/0389334 A1 Dec. 26, 2019

(30) Foreign Application Priority Data

Jun. 22, 2018 (JP) .............................. JP2018-119271

(51) Int. Cl.
*B60N 2/90* (2018.01)
*B60N 2/14* (2006.01)
*B60N 2/08* (2006.01)
*B60N 2/22* (2006.01)

(52) U.S. Cl.
CPC ........... *B60N 2/146* (2013.01); *B60N 2/0831* (2013.01); *B60N 2/2227* (2013.01)

(58) Field of Classification Search
CPC ..... B60N 2/146; B60N 2/0831; B60N 2/2227
USPC .......................................... 297/463.1, 463.2
See application file for complete search history.

(56) References Cited

U.S. PATENT DOCUMENTS

| 7,472,963 | B2 * | 1/2009 | Jeong ................... | B60N 2/0296 297/463.1 |
| 7,862,121 | B2 * | 1/2011 | Ishijima ............... | B60N 2/0296 297/367 R |
| 7,938,490 | B2 * | 5/2011 | Ishijima ............... | B60N 2/0296 297/463.1 X |
| 7,959,229 | B2 * | 6/2011 | Ishijima ............... | B60N 2/0296 297/463.1 X |
| 8,162,404 | B2 * | 4/2012 | Ueda .................... | B60N 2/0296 297/463.1 X |
| 8,353,561 | B2 * | 1/2013 | Yamazaki ............ | B60N 2/6009 297/463.1 X |

(Continued)

FOREIGN PATENT DOCUMENTS

| CN | 101722879 A | 6/2010 |
| CN | 104619551 A | 5/2015 |
| JP | 2012116209 A | 6/2012 |

*Primary Examiner* — Rodney B White
(74) *Attorney, Agent, or Firm* — Dinsmore & Shohl LLP (57) ABSTRACT A vehicle seat operating device has a reclining lever, a lifting lever and a getting in/out support lever for rotating a vehicle seat in a horizontal plane. A reclining lever operation surface and a lifting lever underside operation surface are accessible from a side of the seat. The getting in/out support lever has a recess section which is formed toward the front, and an operation surface which is a ceiling surface of the recess is accessible from the front. Side access to the operation surface is blocked by an out sidewall located on a seat width direction outer side of the operation surface. The getting in/out support lever is easily distinguished from the other two levers because accessible directions are different.

6 Claims, 5 Drawing Sheets (56) References Cited

U.S. PATENT DOCUMENTS

| | | | | |
|---|---|---|---|---|
| 9,022,477 | B2* | 5/2015 | Pleskot | B60N 2/06 |
| | | | | 297/463.1 X |
| 9,132,752 | B2* | 9/2015 | Pleskot | B60N 2/6009 |
| 9,216,667 | B1* | 12/2015 | Izawa | B60N 2/6009 |
| 9,744,883 | B2* | 8/2017 | Nakagawa | B60N 2/16 |
| 9,821,690 | B2* | 11/2017 | Nakagawa | B60N 2/90 |
| 10,017,085 | B2* | 7/2018 | Kienke | B60N 2/167 |
| 10,059,240 | B2* | 8/2018 | Mitsumoto | B60N 2/58 |
| 10,112,506 | B2* | 10/2018 | Izawa | B60N 2/16 |
| 10,179,528 | B2* | 1/2019 | Minegishi | B60N 2/58 |
| 2009/0058158 | A1* | 3/2009 | Sobieski | B60N 2/22 |
| | | | | 297/463.1 X |
| 2010/0090515 | A1 | 4/2010 | Yamazaki et al. | |
| 2012/0133187 | A1 | 5/2012 | Ootsuka et al. | |
| 2015/0183344 | A1 | 7/2015 | Kienke | |
| 2020/0139851 | A1* | 5/2020 | Oshima | B60N 2/14 |

* cited by examiner

VEHICLE SEAT OPERATING DEVICE

CROSS-REFERENCE TO RELATED APPLICATIONS

This application claims priority to Japanese Patent Application No. 2018-119271 filed on Jun. 22, 2018, which is incorporated herein by reference in its entirety including the specification, claims, drawings, and abstract.

TECHNICAL FIELD

The present disclosure relates to a vehicle seat operating device provided with levers for movement movable parts of a vehicle seat.

BACKGROUND

The vehicle seat has movable parts to properly maintain a posture of an occupant seated in the seat. For the vehicle seat shown in the following Patent Literature 1, a so-called reclining movement for changing the angle of a seat back (2) and a sliding movement to slide the whole seat in vehicle longitudinal and lateral directions can be performed. For such movements, the vehicle seat is provided with operating devices. Specifically, a release lever (6C) for releasing the locking of the reclining movement and an operating lever (7) for releasing the locking of the sliding movement are provided on a side surface of the vehicle seat. The locking of the reclining movement is released by operating the release lever (6C), the angle of the seat back (2) can be adjusted to a desired angle, and the release lever (6C) is returned to lock the movement again. Similarly, when the operating lever (7) is operated, the sliding movement lock is released, and when the operating lever (7) is returned, the movement is locked again. Reference numerals in the above parentheses are used in the following Patent Literature 1 and irrelevant to those used in the description of the following embodiments of the present disclosure.

CITATION LIST

Patent Literature

Patent Literature 1: JP 2012-116209 A

SUMMARY

When operating a lever, an occupant often gropes around for it. Therefore, when there are plural levers, it is hard to distinguish by groping which operating lever corresponds to which movement of the seat.

The present disclosure makes it easy to distinguish among operating levers corresponding to respective movements.

The vehicle seat operating device according to the present disclosure has a device body which is provided on a side portion of the vehicle seat, and first and second operating levers which are pivotably provided on the device body so that their front ends move vertically. The first operating lever has a first lever operation surface facing downward, and the first lever operation surface can be accessed from the side of the seat. The second operating lever has a second lever operation surface facing downward, and the second lever operation surface can be accessed from the front, but the access from side of the seat is blocked by a blocking wall provided adjacent to the second lever operation surface.

When operating the first operating lever, an occupant inserts a finger to reach the underside of the first operating lever from a side of the seat to access the first lever operation surface. Also, when operating the second operating lever, a finger is inserted from the front to access the second lever operation surface. Since the access to the second lever operation surface from side of the seat is blocked by the blocking wall, the occupant cannot access the second operating lever even if the occupant tries to access from the side. Thus, it is easy to distinguish between the two operating levers.

For example, the blocking wall for blocking the access to the second lever operation surface may be provided on the second operating lever or on the device body.

Also, a recess may be formed on the front-end surface of the second operating lever. A ceiling surface of an inside surface of this recess becomes a second lever operation surface. Further, the outer sidewall of the second operating lever defining a seat width direction outer side surface of the inside surface of the recess becomes the blocking wall. The outer sidewall as the blocking wall may be arranged flush with the side surface of the device body adjacent to the outer sidewall, or on a side that is further inward than the adjacent side surface in the seat width direction.

The second lever operation surface and the blocking wall can be formed easily by forming a recess on the front-end surface of the second operating lever. Also, the outer sidewall of the second operating lever as the blocking wall is arranged flush with the side surface of the adjacent device body or on the inner side than the side surface in the seat width direction to block the access from side of the seat to the bottom surface of the second operating lever.

Also, a ridge line portion, which is formed by a side surface at the seat width direction outer side and under surface of the second operating lever, may be round chamfered. On the other hand, the device body is determined to have an opposed surface opposite to the under surface of the second operating lever and may be provided with a projected line, which extends in the seat front-back direction and has a complementary shape with the round chamfered portion of the ridge line portion, on a side edge at the seat width direction outer side of the opposed surface.

Round chamfering is provided on the ridge line portion formed between the side and under surfaces of the second operating lever, so that the touch feeling of the chamfered portion can be improved. The provision of the projected line, which has a complementary shape with the round chamfered portion, on the opposed surface of the device body, can make a gap between the second operating lever and the device body inconspicuous.

The second operating lever may also be positioned in front of the first operating lever. The second operating lever to be accessed from the front is arranged at the front to facilitate access to the second operating lever.

The first operating lever may also be a lever for releasing the locking of the vehicle seat reclining movement, and the second operating lever may be a lever for releasing the locking of either or both of the rotating movement in the horizontal plane and the sliding movement in the front-back direction of the vehicle seat.

The vehicle seat operating device may be additionally provided with a third operating lever between the first operating lever and the second operating lever on the device body, so that it is pivotable to move its front end vertically. The third operating lever has a third lever operation surface which faces downward and can be accessed from a side of the seat. Either the first operating lever or the third operating lever may be a lever for releasing the locking of the vehicle seat reclining movement, and the other can be a lever for adjusting the vehicle seat height. The second operating lever can be a lever for releasing the locking of either or both of the rotating movement in the horizontal plane and the sliding movement in the front-back direction of the vehicle seat.

According to the present disclosure, access directions to two operating levers are differentiated to facilitate distinguishing between the operating levers when a particular operating lever is to be operated.

BRIEF DESCRIPTION OF THE DRAWINGS

Embodiment(s) of the present disclosure will be described based on the following figures, wherein.

DESCRIPTION OF EMBODIMENTS

Figure 1:
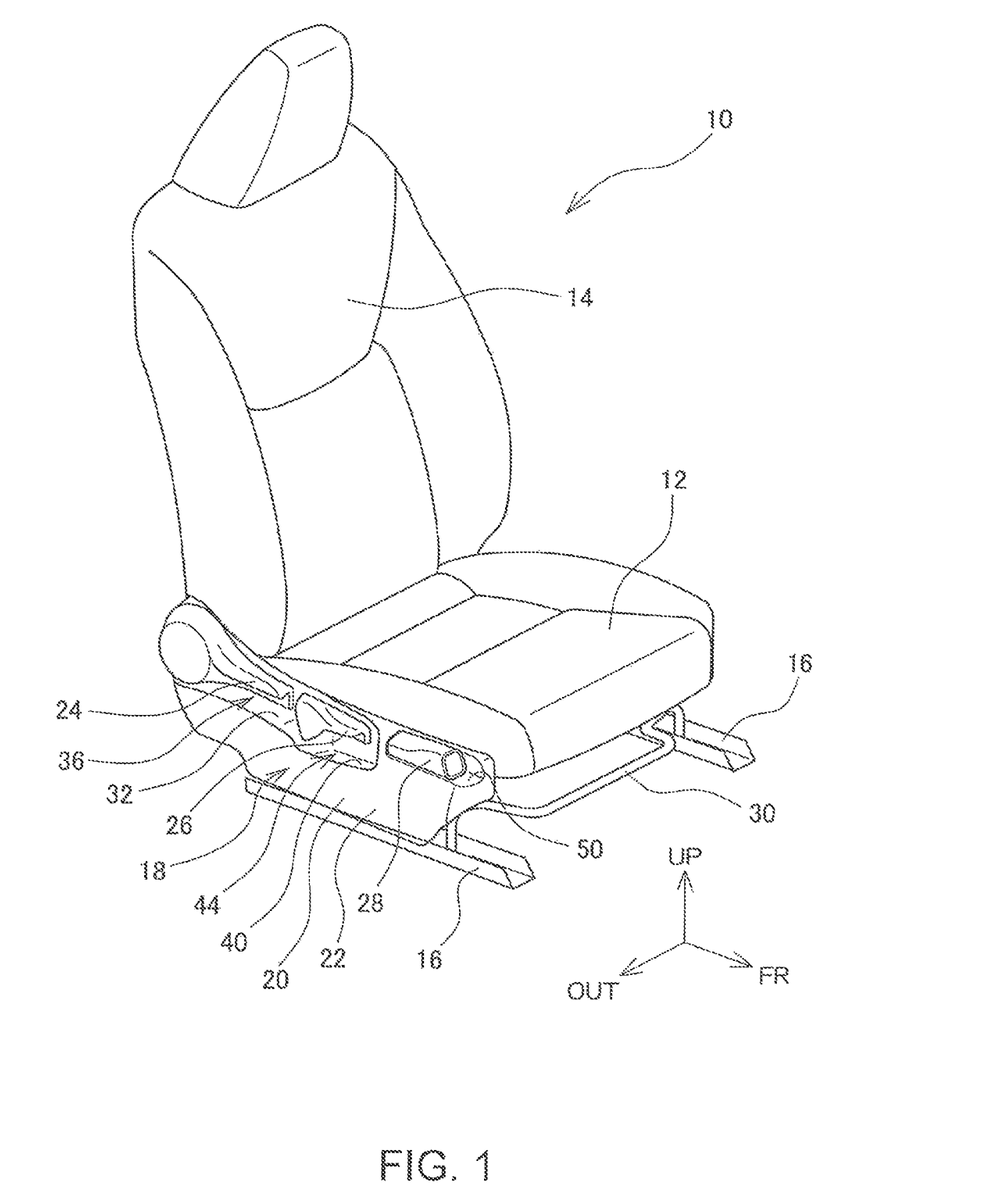
FIG. 1 is a perspective view showing an outline structure of a vehicle seat according to the present disclosure.

Embodiments of the present disclosure are described below with reference to the drawings. FIG. 1 is a perspective view showing a vehicle seat 10, and particularly a seat for the front seat. In the following description, unless otherwise specified, words representing directions and orientations, such as front, forward, back, backward, left, right, sideways, up, upward, down, and downward, indicate directions and orientations of an occupant seated in the vehicle seat 10. In respective drawings, a direction of arrow FR indicates forward and a direction of arrow UP indicates upward. As to a lateral direction or a seat width direction, a side far from a median plane of the vehicle seat 10 is referred to as a seat width direction outer side, and a side near to the median plane is referred to as a seat width direction inner side. In each drawing, a direction from the median plane toward the seat width direction outer side is indicated by arrow OUT.

The vehicle seat 10 includes a seat cushion 12 for supporting the buttocks of the occupant and a seat back 14 for supporting the upper body. The seat back 14 can be moved to adjust its angle relative to the seat cushion 12 or to make a reclining movement. The vehicle seat 10 is slidable along two slide rails 16 which are fixed on a vehicle floor to extend in the vehicle longitudinal direction so as to adjust the seat position in the longitudinal direction within the vehicle cabin. The vehicle seat 10 is also movable vertically to adjust the height of the seat surface of the seat cushion 12. The occupant can take a desired seated posture by the above reclining, sliding and lifting movements. In particular, a driver's seat position can be adjusted properly in connection with the height of the driver's point of view and respective operators such as an accelerator pedal, a brake pedal and a steering wheel. Further, the vehicle seat 10 can be rotated in the horizontal plane. This rotating movement directs the vehicle seat 10 to the outside of the vehicle through the door opening of the vehicle and makes it easy to get in and out of the vehicle.

A vehicle seat operating device 18 for operating respective movable parts of the vehicle seat 10 is provided on a side portion of the vehicle seat 10, and particularly on a side portion of the seat cushion 12. The movable parts of the vehicle seat 10 are normally locked by a locking mechanism and unlocked when their movements are required to make adjustment related to respective movements. The vehicle seat operating device 18 has a device body 20 that includes a driving mechanism for moving the respective movable parts of the vehicle seat 10 and the locking mechanisms for locking the respective movements. The device body 20 also includes a seat side shield 22 for covering the internal mechanisms such as the driving mechanism and the locking mechanism. To move the movable parts and to enable the movement of the movable parts by unlocking, the vehicle seat operating device 18 is provided with operating levers 24, 26, 28 corresponding to the respective movements.

Figure 2:
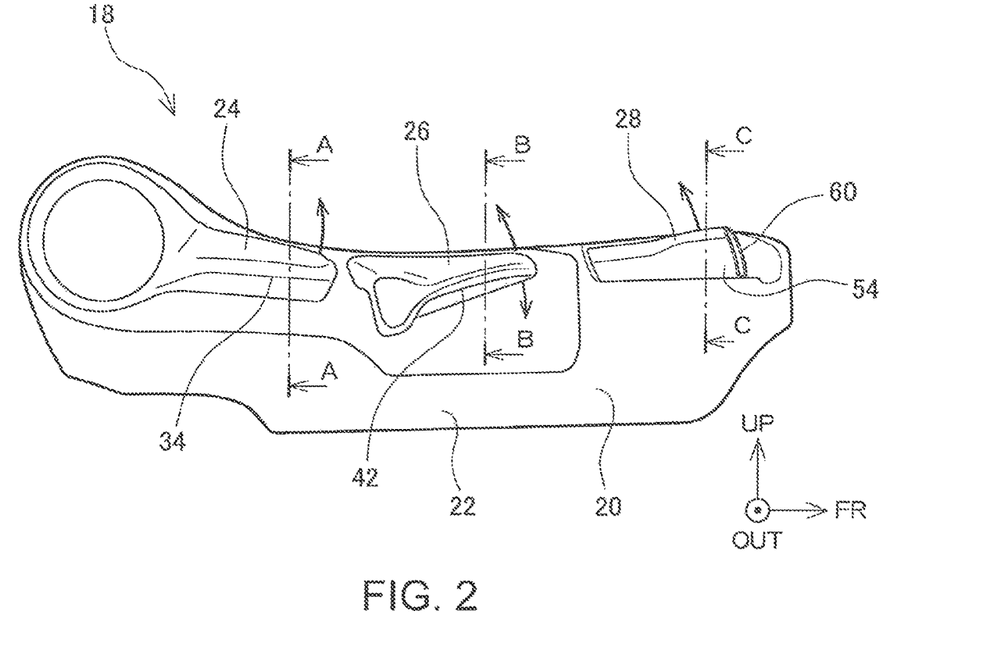
FIG. 2 is a view showing an outline structure of a vehicle seat operating device.

FIG. 2 is a view of the vehicle seat operating device 18 seen from the seat right side. Among the three operating levers, the operating lever 24 arranged at the rearmost position is an operating lever for a reclining movement of the seat back 14. This operating lever is hereinafter referred to as a reclining lever 24. The reclining lever 24 can be pivoted to move its front end vertically with its rear end as an axis. The reclining lever 24 is biased clockwise in FIG. 2 to a normal position as shown in FIG. 2. This position is the lower limit position in the operation range of the reclining lever 24. In this state, the mechanism for the reclining movement is locked, and the angle of the seat back 14 is fixed. To perform the adjustment of the angle of the seat back 14 or the reclining movement, the front end of the reclining lever 24 is pulled up to cause pivoting. Thus, the lock is released, and the angle of the seat back 14 becomes adjustable. After the angle is adjusted to a desired angle, the reclining lever 24 is released to return to the normal position by a biasing force, and the reclining movement is locked.

The operating lever 26 arranged in the middle of the three operating levers is an operating lever for a lifting movement of the vehicle seat 10. This operating lever is hereinafter referred to as a lifting lever 26. The lifting lever 26 can be pivoted to move the front end vertically around its rear end. The lifting lever 26 is biased to return to the position shown in FIG. 2, and this position shown in FIG. 2 is a neutral position in the operation range. In this state, the height of the vehicle seat 10 is maintained. To perform the adjustment of the height of the vehicle seat 10 or the lifting movement, the lifting lever 26 is operated. When the front end of the lifting lever 26 is pulled up to cause pivoting of the lever, the vehicle seat 10 is lifted by a predetermined amount. Accordingly, the seat surface of the seat cushion 12 becomes high. When a hand is released from the lifting lever 26, the height of the seat surface is maintained as it is, and the lifting lever 26 returns to the neutral position. For additional lifting of the vehicle seat 10, the lifting lever 26 is pivoted by pulling the front end of the lifting lever 26 up again. This procedure is repeated until a desired height is obtained. On the other hand, when the front end of the lifting lever 26 is pushed down to cause pivoting, the vehicle seat 10 is lowered by a predetermined amount. Accordingly, the seat surface of the seat cushion 12 is lowered. When the hand is released from the lifting lever 26, the height of the seat surface is maintained as it is, and the lifting lever 26 returns to the neutral position. When the vehicle seat 10 is desired to be further lowered, the front end of the lifting lever 26 is pushed down again to cause pivoting. This procedure is repeated until a desired height is obtained.

The operating lever 28 arranged at the frontmost position among the three operating levers is an operating lever for rotation of the vehicle seat 10 in a horizontal plane. This operating lever is hereinafter referred to as a getting in/out support lever 28. The getting in/out support lever 28 can be pivoted to move its front end vertically with the rear end as an axis. The getting in/out support lever 28 in FIG. 2 is biased clockwise and normally positioned at the position shown in FIG. 2. This position is a lower limit position of the operation range of the getting in/out support lever 28. In this state, a mechanism for the rotating movement is locked to fix the direction of the vehicle seat 10. When the vehicle seat 10 is to be directed outward of the vehicle or the rotating movement is to be performed, the front end of the getting in/out support lever 28 is pulled up to pivot the lever to release the lock. Thus, the direction of the vehicle seat 10 becomes changeable, and the vehicle seat 10 can be directed to the vehicle outside. After the direction of the vehicle seat 10 is changed, the hand is released from the getting in/out support lever 28 to allow the getting in/out support lever 28 to return to the normal position by a biasing force, and the rotating movement is locked.

The vehicle seat 10 is also provided with a slide bar 30 for sliding the vehicle seat 10 below the front end of the seat cushion 12 (see FIG. 1). The slide bar 30 is vertically movable and biased downward to be normally positioned at a lower end of the operation rang. When the slide bar 30 is pulled up, the mechanism for sliding the vehicle seat 10 is unlocked. With the lock released, the slide position of the vehicle seat 10 is adjusted to a desired position, and the hand is released from the slide bar 30, then the sliding movement is locked.

Figure 3:
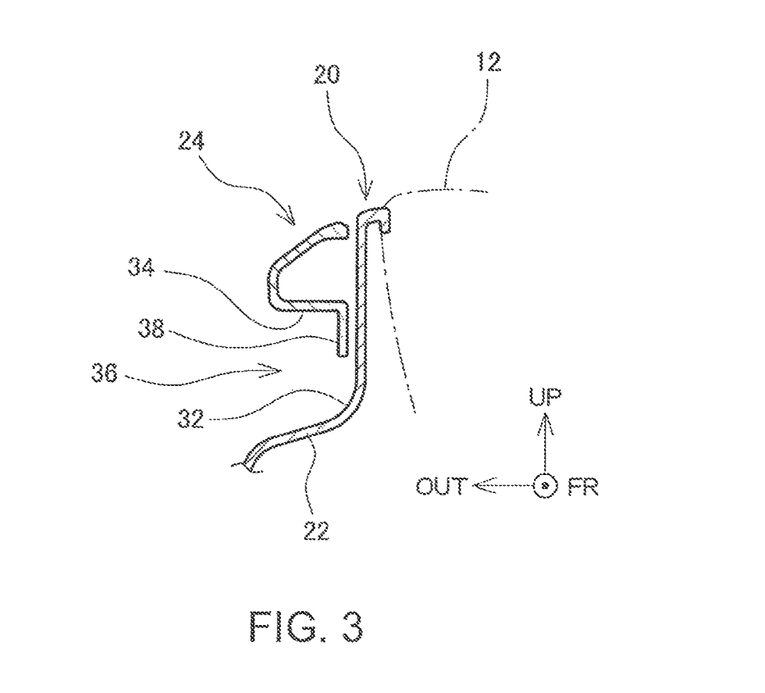
FIG. 3 is a cross sectional view showing a reclining lever and its surrounding structure.

FIG. 3 is a cross sectional view showing the reclining lever 24 and its surrounding structure taken along the A-A line in FIG. 2. An internal mechanism is omitted from FIG. 3. A corner recess 32 is formed on an upper corner portion in the seat width direction outer side of the device body 20. The reclining lever 24 is arranged in an upper part of the corner recess 32, and a recess section 36 having a substantially U-shaped cross section is formed by a under surface 34 of the reclining lever 24 and a surface of the seat side shield 22 defining the corner recess 32. When operating the reclining lever 24, an operator inserts fingers into the recess section 36 from the seat width direction outer side to access the under surface 34 of the reclining lever 24 to operate it. Hereinafter, the under surface 34 is referred to as a reclining lever operation surface 34, and the recess section 36 is referred to as an access recess section 36. A reclining lever flange 38 is formed on an edge at the seat width direction inner side of the reclining lever operation surface 34.

When operating the reclining lever 24, the operator accesses the reclining lever operation surface 34 within the access recess section 36 from the seat width direction outer side and pulls the reclining lever operation surface 34 upward with their fingers to cause pivoting of the lever counterclockwise in FIG. 2.

Figure 4:
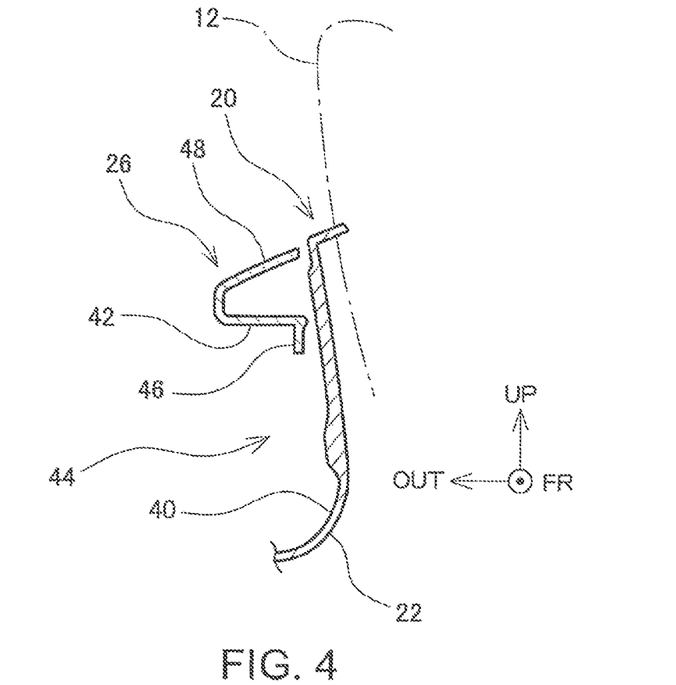
FIG. 4 is a cross sectional view showing a lifting lever and its surrounding structure.

FIG. 4 is a cross sectional view showing the lifting lever 26 and its surrounding structure taken along the B-B line in FIG. 2. An internal mechanism is omitted from FIG. 4. A corner recess 40 is formed on an upper corner portion at the seat width direction outer side of the device body 20. This corner recess 40 may be continuous to the corner recess 32 formed relative to the reclining lever 24. The lifting lever 26 is arranged in an upper part of the corner recess 40, and a recess section 44 having a substantially U-shaped cross section is formed by a under surface 42 of the lifting lever 26 and a surface of the seat side shield 22 defining the corner recess 40. When operating the lifting lever 26, the operator inserts fingers into the recess section 44 from the seat width direction outer side to access the under surface 42 of the lifting lever 26 and operates the lever. Hereinafter, this under surface 42 is referred to as a lifting lever underside operation surface 42, and the recess section 44 is referred to as an access recess section 44. A lifting lever flange 46 is provided on an edge at the seat width direction inner side of the lifting lever underside operation surface 42. The lifting lever 26 is also operated downward, so that an upper surface 48 of the lifting lever 26 also becomes an operation surface, and this upper surface 48 is referred to as a lifting lever upside operation surface 48.

When operating the lifting lever 26 to lift up the vehicle seat 10, the operator accesses the lifting lever underside operation surface 42 in the access recess section 44 from the seat width direction outer side, and pushes upward the lifting lever underside operation surface 42 with their fingers to cause pivoting of the lever counterclockwise in FIG. 2. When operating the lifting lever 26 to lower the vehicle seat 10, the operator pushes down the lifting lever upside operation surface 48 with their fingers or a hand to cause pivoting of the lever clockwise in FIG. 2.

Figure 5:
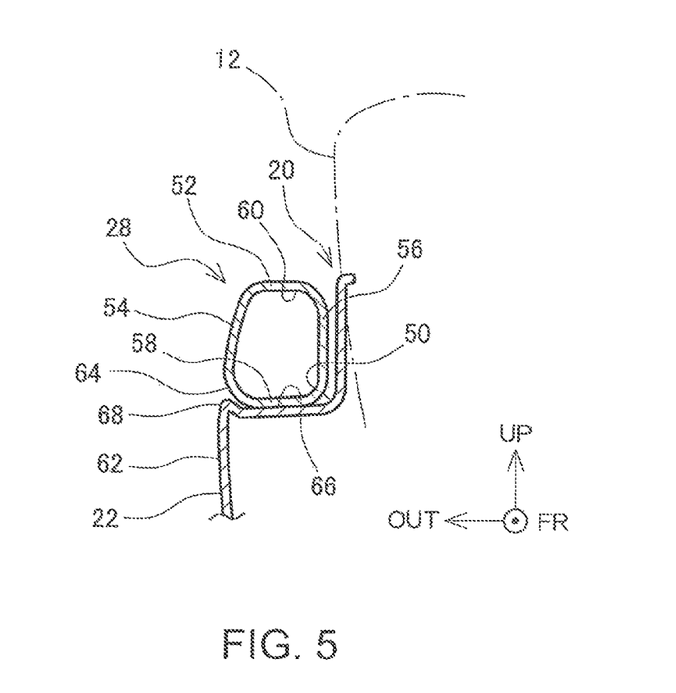
FIG. 5 is a cross sectional view showing a getting in/out support lever and its surrounding structure.
Figure 6:
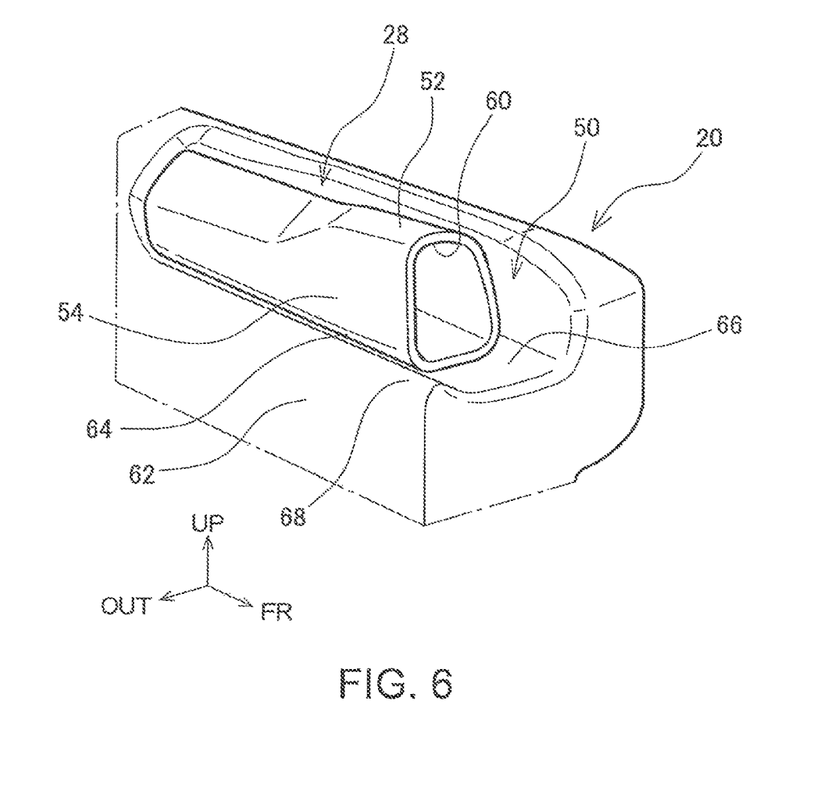
FIG. 6 is a perspective view showing the getting in/out support lever and its surrounding structure.

FIG. 5 and FIG. 6 are views showing the getting in/out support lever 28 and its surrounding structure, FIG. 5 is a cross sectional view taken along the C-C line in FIG. 2, and FIG. 6 is a perspective view. An internal mechanism is omitted from FIG. 5.

A corner recess 50 is formed on an upper corner portion in the seat width direction outer side of the device body 20. The getting in/out support lever 28 is arranged to fill this corner recess 50 to make the seat width direction outer side surfaces of the device body 20 and the getting in/out support lever 28 flush with each other. Also, the upper surface of the device body 20 and the upper end of the getting in/out support lever 28 have approximately the same height. The getting in/out support lever 28 has at least a cylindrical front end portion, and this cylindrical shape has a square cross-sectional shape with rounded corners. The getting in/out support lever 28 is provided with a cylindrical portion at its front end so as to have a recess formed on the front-end surface toward the front. A part forming a ceiling of this cylindrical portion is referred to as a ceiling wall 52, a wall at the outer side in the seat width direction is referred to as an outer sidewall 54, a wall at the inner side is referred to as an inner sidewall 56, and a portion forming the bottom is referred to as a bottom wall 58.

When operating the getting in/out support lever 28, the operator inserts a finger from the front into a recess of the getting in/out support lever 28, namely a cylindrical inside space, to access a ceiling surface 60 of the inside surface defining this inner space to operate the lever. This ceiling surface 60 functions as an operation surface for operating the getting in/out support lever 28, and this ceiling surface 60 is referred to as a getting in/out support lever operation surface 60.

The outer sidewall 54 of the getting in/out support lever 28 defines the inside surface of the seat width direction outer side of the recess at the front end surface of the getting in/out support lever 28. The outer sidewall 54 is located adjacent to the seat width direction outer side of the getting in/out support lever operation surface 60 and functions as a blocking wall for preventing the access to the getting in/out support lever operation surface 60 from the seat width direction outer side. The outer sidewall 54 is arranged adjacent to a side surface 62 (hereinafter referred to as an outer side surface 62) of the seat width direction outer side of the device body 20 and flush with the outer side surface 62. By arranging in this way, access to the under surface of the getting in/out support lever 28, namely the under surface of the bottom wall 58, is blocked by the outer side surface 62 of the device body. Also, access to the lower side of the getting in/out support lever 28, namely the under surface of the bottom wall 58, can be blocked even when the outer sidewall 54 of the getting in/out support lever 28 is not flush with the outer side surface 62 of the device body but located inwards in the seat width direction from the outer side surface 62.

A ridge line portion 64, which is formed by the seat width direction outer side surface and the under surface of the getting in/out support lever 28, is round chamfered to have a round corner. The device body 20 has an opposed surface 66 opposing the under surface of the getting in/out support lever 28. A projected line 68 which is extended in the front-back direction is formed on the seat width direction outer side edge of the opposed surface 66. The projected line 68 has a shape to compensate for the portion removed by round chamfering of the ridge line portion 64 to fill a gap between the seat width direction outer side surfaces of the getting in/out support lever 28 and the device body 20.

When operating the getting in/out support lever 28, the operator accesses the getting in/out support lever operation surface 60 from the front, and pushes the getting in/out support lever operation surface 60 upward with a finger to cause pivoting of the lever counterclockwise in FIG. 2. Access to the getting in/out support lever 28 from the side is blocked by the outer sidewall 54 of the getting in/out support lever and the outer side surface 62 of the device body. Thus, the getting in/out support lever 28 is easily distinguished from the reclining levers 24 and the lifting lever 26 because its access direction is different from the access directions to the operating lever 24 and 26 described above.

Figure 7:
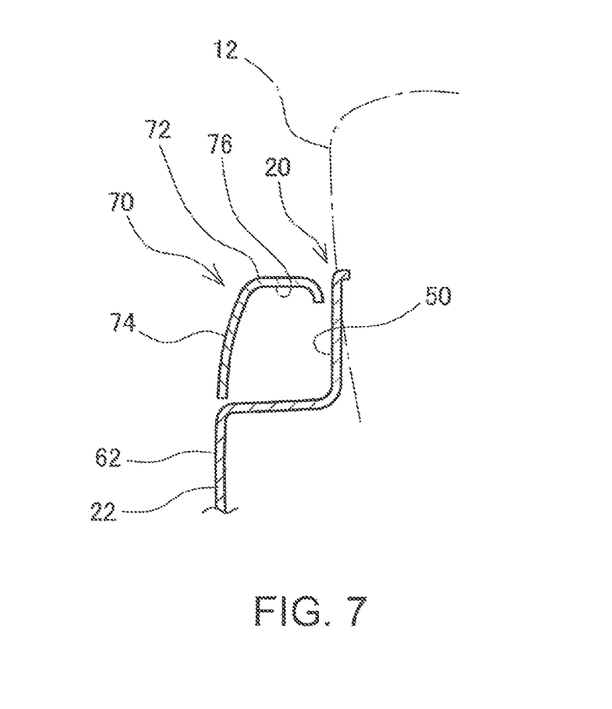
FIG. 7 is a cross sectional view showing another embodiment of the getting in/out support lever.

FIG. 7 is a cross sectional view of a getting in/out support lever of another embodiment taken at the same position along the C-C line shown in FIG. 2. The getting in/out support lever 70 has a ceiling wall 72 and an outer sidewall 74 which correspond to the ceiling wall 52 and the outer sidewall 54 of the above-described getting in/out support lever 28. The getting in/out support lever 70 has an approximately inverted L-shaped cross-sectional shape formed by the ceiling wall 72 and the outer sidewall 74.

When operating the getting in/out support lever 70, the operator accesses, from the front, a ceiling surface 76 of an inside space surrounded by the getting in/out support lever 70 and the corner recess 50 of the device body 20. Therefore, the ceiling surface 76 or the under surface of the ceiling wall 72 functions as an operation surface for operating the getting in/out support lever 70. This ceiling surface 76 is hereinafter referred to as a getting in/out support lever operation surface 76.

The outer sidewall 74 of the getting in/out support lever 70 defines the inside surface of the seat width direction outer side of the inside space surrounded by the getting in/out support lever 70 and the corner recess 50. The outer sidewall 74 is located adjacent to the seat width direction outer side of the getting in/out support lever operation surface 76 and functions as a blocking wall for blocking the access from the seat width direction outer side to the getting in/out support lever operation surface 76. The outer sidewall 74 is arranged adjacent to the outer side surface 62 of the device body 20 and arranged flush with outer side surface 62. By arranging in this way, access to a lower surface of the getting in/out support lever 70, particularly to the lower edge of the outer sidewall 74 is blocked by the outer side surface 62 of the device body. Also, access to the lower side of the getting in/out support lever 70 can be blocked even when the outer sidewall 74 of the getting in/out support lever 70 is not flush with the outer side surface 62 of the device body but positioned inwards in the seat width direction from the outer side surface 62.

When operating the getting in/out support lever 70, the operator accesses the getting in/out support lever operation surface 76 from the front, and pushes the getting in/out support lever operation surface 76 upward with a finger to cause pivoting of the lever counterclockwise in FIG. 2. Access to the getting in/out support lever 70 from the side is blocked by the outer sidewall 74 of the getting in/out support lever and the outer side surface 62 of the device body. Thus, the getting in/out support lever 70 is easily distinguished from the reclining levers 24 and the lifting lever 26 because its access direction is different from the access directions of the operating lever 24 and 26 described above.

Figure 8:
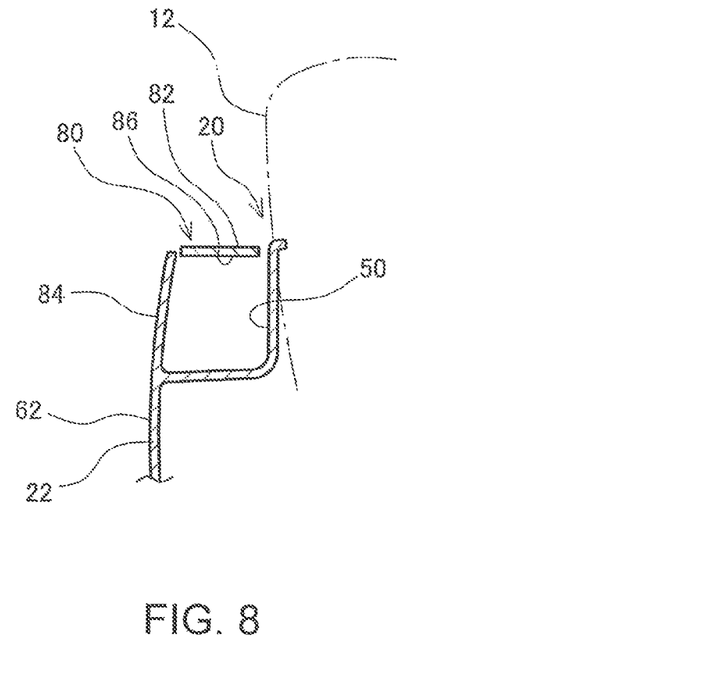
FIG. 8 is a cross sectional view showing a still another embodiment of the getting in/out support lever.

FIG. 8 is a cross sectional view of a getting in/out support lever of another embodiment taken at the same position along the C-C line shown in FIG. 2. A getting in/out support lever 80 has a flat plate-shaped operation plate 82, and this operation plate 82 corresponds to the ceiling wall 52 of the above-described getting in/out support lever 28. The seat side shield 22 of the device body 20 is provided with an outer wall 84 so as to be adjacent to the operation plate 82. The outer wall 84 may have its seat width direction outer side surface provided as a surface which has the outer side surface 62 of the device body 20 extended.

When operating the getting in/out support lever 80, the operator accesses, from the front, a ceiling surface 86 of an inside space surrounded by the getting in/out support lever 80 and the corner recess 50 and the outer wall 84 of the device body 20. Therefore, the ceiling surface 86 or the under surface of the operation plate 82 functions as an operation surface for operating the getting in/out support lever 80. This ceiling surface 86 is hereinafter referred to as a getting in/out support lever operation surface 86.

The outer wall 84 of the seat side shield 22 defines an inside surface of the seat width direction outer side of the inside space surrounded by the outer wall 84, the getting in/out support lever 80 and the corner recess 50. The outer wall 84 is located adjacent to the seat width direction outer side of the getting in/out support lever operation surface 86 and functions as a blocking wall for blocking access from the seat width direction outer side to the getting in/out support lever operation surface 86. Also, access to the getting in/out support lever 80 can be blocked even when the outer wall 84 is not flush with the outer side surface 62 of the device body but positioned inwards in the seat width direction from the outer side surface 62.

When operating the getting in/out support lever 80, the operator accesses, from the front, the getting in/out support lever operation surface 86 and pushes the getting in/out support lever operation surface 86 upward with a finger to cause pivoting of the lever counterclockwise in FIG. 2. Access from the side to the getting in/out support lever 80 is blocked by the outer wall 84 of the seat side shield 22. Thus, the getting in/out support lever 80 is easily distinguished from the reclining levers 24 and the lifting lever 26 because its access direction is different from the access directions of the operating lever 24 and 26 described above.

Among the three operating levers 24, 26, 28 of the vehicle seat operating device 18, the operating lever 28 positioned at the front may be used as an operating lever relating to the sliding movement of the vehicle seat 10 in the vehicle longitudinal direction in place of or in addition to the rotating movement of the vehicle seat 10 in the horizontal plane. Also, the functions of the operating lever 26 positioned in the middle and the operating lever 28 positioned at the rear can be exchanged with each other to arrange the operating lever relating to the reclining movement in the middle and the operating lever relating to the lifting movement at the rear.

The vehicle seat operating device 18 provided on a vehicle front seat was explained above, but the vehicle seat operating device 18 may also be provided on a rear seat.

REFERENCE SIGNS LIST

10 Vehicle seat; 12 Seat cushion; 14 Seat back; 16 Slide rails; 18 Vehicle seat operating device; 20 Device body; 22 Seat side shield; 24 Reclining lever (first or third operating lever); 26 Lifting lever (first or third operating lever); 28 Getting in/out support lever (second operating lever); 30 Slide bar; 32 Corner recess; 34 Reclining lever operation surface (first or third lever operation surface); 36 Access recess section; 38 Reclining lever flange; 40 Corner recess; 42 Lifting lever underside operation surface (first or third lever operation surface); 44 Access recess section; 46 Lifting lever flange; 48 Lifting lever upper side operation surface; 50 Corner recess; 52 Ceiling wall; 54 Outer sidewall (blocking wall); 56 Inner sidewall; 58 Bottom wall; 60 Getting in/out support lever operation surface (second lever operation surface); 62 Outer side surface; 64 Ridge line portion; 66 Opposed surface; 68 Projected line; 70 Getting in/out support lever; 72 Ceiling wall; 74 Outer sidewall (blocking wall); 76 Getting in/out support lever operation surface (second lever operation surface); 80 Getting in/out support lever; 82 Operation plate; 84 Outer wall; 86 Getting in/out support lever operation surface (second lever operation surface).

The invention claimed is:

1. A vehicle seat operating device for operating movable parts of a vehicle seat, comprising:
a device body provided on a side portion of the vehicle seat;
a first operating lever pivotably provided on the device body to move its front end vertically and provided with a first lever operation surface facing downward to be accessible from a side of the vehicle seat; and
a second operating lever pivotably provided on the device body to move its front end vertically and provided with a second lever operation surface facing downward to be accessible from the front end, the second lever operation surface being blocked by an adjacent blocking wall from being accessed from a side of the vehicle seat, the blocking wall provided on a side of the second operating lever opposite a side of the device body to which the second operating lever is pivotally provided, the second lever operation surface being blocked from a side opposite the second lever operation surface by a bottom surface extending in a front-back direction of the vehicle seat and opposite the second lever operation surface.

2. The vehicle seat operating device according to claim 1, wherein:
a recess is formed on the front end of the second operating lever;
a ceiling surface of an inside surface of the recess is the second lever operation surface;
an outer sidewall of the second operating lever, which defines a side surface of the seat width direction outer side of the inside surface of the recess, is the blocking wall; and
the outer sidewall is arranged flush with an adjacent side surface of the device body or on a side that is further inward than the adjacent side surface in the seat width direction.

3. The vehicle seat operating device according to claim 2, wherein:
a ridge line portion, which is formed by a side surface of the seat width direction outer side and an under surface of the second operating lever, is a round chamfered portion; and
the device body is provided with an opposed surface opposite to the under surface of the second operating lever and is provided with a projected line, which extends in the front-back direction of the vehicle seat and has a complementary shape with the round chamfered portion of the ridge line portion, on a side edge at the seat width direction outer side of the opposed surface.

4. The vehicle seat operating device according to claim 1, wherein the second operating lever is positioned in front of the first operating lever.

5. The vehicle seat operating device according to claim 1, wherein:
the first operating lever is a lever for releasing the locking of a reclining movement of the vehicle seat; and
the second operating lever is a lever for releasing the locking of either or both of a rotating movement in a horizontal plane and a sliding movement in the front-back direction of the vehicle seat.

6. The vehicle seat operating device according to claim 1, wherein:
a third operating lever is further provided between the first operating lever and the second operating lever on the device body so as to preform pivoting movement of its front end vertically, and has a third lever operation surface facing downward to be accessible from a side of the vehicle seat; and
one of the first operating lever and the third operating lever is a lever for releasing the locking of a reclining movement of the vehicle seat, the other is a lever for a lifting movement of the vehicle seat, and the second operating lever is a lever for releasing the locking of either or both of a rotating movement in a horizontal plane and a sliding movement in the front-back direction of the vehicle seat.

* * * * *